United States Patent [19]

McEwan

[11] Patent Number: 5,906,274
[45] Date of Patent: May 25, 1999

[54] COMPACT DISC CASE

[76] Inventor: Sturt McEwan, 39 Ellalong Road, Cremorne, Australia, NSW 2090

[21] Appl. No.: 08/945,042
[22] PCT Filed: Apr. 12, 1996
[86] PCT No.: PCT/AU96/00221
  § 371 Date: Oct. 10, 1997
  § 102(e) Date: Oct. 10, 1997
[87] PCT Pub. No.: WO96/32719
  PCT Pub. Date: Oct. 17, 1996

[30] Foreign Application Priority Data

Apr. 13, 1995 [AU] Australia ................ PN2396

[51] Int. Cl.⁶ .................................... B65D 85/57
[52] U.S. Cl. ................ 206/308.1; 206/1.5; 206/309
[58] Field of Search ............... 206/1.5, 307, 308.1, 206/309–313, 493; 220/326

[56] References Cited

U.S. PATENT DOCUMENTS

| 4,730,731 | 3/1988 | Allison ............................. 206/1.5 |
| 4,774,973 | 10/1988 | Gueret ............................. 220/326 |
| 5,011,010 | 4/1991 | Francis et al. . |
| 5,033,634 | 7/1991 | Batchelor et al. .............. 220/326 |
| 5,158,176 | 10/1992 | Wolf . |
| 5,322,162 | 6/1994 | Melk . |
| 5,413,219 | 5/1995 | Yu .................................. 206/1.5 |
| 5,417,323 | 5/1995 | Presnick . |
| 5,515,967 | 5/1996 | Fitzsimmons et al. . |
| 5,526,926 | 6/1996 | Deja ............................... 206/308.1 |
| 5,533,615 | 7/1996 | McCamy . |
| 5,682,910 | 11/1997 | Kizawa et al. ................. 220/326 |
| 5,690,218 | 11/1997 | McCamy et al. ............... 206/306.1 |

FOREIGN PATENT DOCUMENTS

| B38362 | 3/1993 | Australia . |
| B51814 | 11/1993 | Australia . |
| 414306 A1 | 8/1990 | European Pat. Off. . |
| 2285650 | 10/1990 | Japan . |
| 2287895 | 10/1990 | Japan . |
| 2290883 | 10/1990 | Japan . |
| WO 9419806 | 9/1994 | WIPO . |

Primary Examiner—Paul T. Sewell
Assistant Examiner—Luan K. Bui
Attorney, Agent, or Firm—Price Gess & Ubell

[57] ABSTRACT

A case for a compact disc comprises two hinged parts adapted to house a compact disc. One of the parts defines a base which includes a spindle on which the compact disc may be mounted. The other hinged part defines a lid. A catch mechanism, including a button on one of the hinged parts is adapted to interact with the other hinged part and is resiliently mounted on a stem to latch in a snap-fit action with the other hinged part. A resilient biasing element is formed on the base and is disposed adjacent the stem and acts to bias the two hinged parts apart. Depression of the button by a user unlatches the two hinged parts and thereby opens the case. The button is recessed so that the upper surface of the button does not project substantially beyond the planar surface of the lid when the case is closed.

18 Claims, 2 Drawing Sheets

COMPACT DISC CASE

TECHNICAL FIELD

The present Invention relates to a compact disc case which conventionally comprises a clear plastic case (polycarbonate plastic or the like) made with two hinged halves and being closable with a simple latching arrangement.

BACKGROUND ART

It has been found that problems can occur with the conventional compact disc case.

One problem which is commonly experienced is that of the latch for holding the two hinged halves of the case in the closed position becoming inoperative over time. The latch becomes subject to wear or breakage over a period of usage, subsequently leading to accidental and unwanted opening of the case.

A further problem experienced with conventional compact disc cases is that information located along an edge surface forming the spine of the case is sometimes difficult to read in certain lighting conditions. Typically the spine of the case displays information regarding the nature of the compact disc contained within and in certain lighting conditions this information can prove difficult to read.

It is therefore an object of the present invention is to provide an improved novel compact disc case which will alleviate some of the problems of the prior art.

SUMMARY OF THE INVENTION

One aspect of the present invention provides a catch mechanism for a compact disc case or the like, said case comprising two hinged parts adapted to house a compact disc or like article, said catch mechanism adapted to hold said hinged parts in a closed position and including a button on one of the hinged parts adapted to interact with the other hinged part to form a latch, said button being formed integrally with said one hinged part and resiliently mounted to latch in a snap-fit action with the other hinged part, said button adapted such that it can be depressed by a user to unlatch the two hinged parts and thereby open the case.

The present invention also provides a compact disc case or the like, said case comprising two hinged parts adapted to house a compact disc or like article and a catch mechanism adapted to hold said hinged parts in a closed position, said catch mechanism including a button on one of the hinged parts adapted to interact with the other hinged part to form a latch, said button being formed integrally with said one hinged part and resiliently mounted to latch in a snap-fit action with the other hinged part, said button adapted such that it can be depressed by a user to unlatch the two hinged parts and thereby open the case.

Preferably the button part is adapted such that it can be depressed by the finger of a user to unlatch the two hinged parts so as to open the case.

Preferably the button part includes a ledge adapted to act upon a surface of the second hinged part to provide the latch.

Preferably the present invention includes a biasing element interacting between the two hinged parts and acting to bias the two hinged parts apart. It is further preferable that the biasing element is formed integrally on one of the said hinged parts. Preferably the biasing element is formed integrally on the same hinged part as the button part.

In a further aspect of the present invention at least one edge surface of the case is curved along a relatively large radius of curvature to avoid light reflection and enable easy reading of information located along or adjacent said curved edge.

BRIEF DESCRIPTION OF THE DRAWINGS

The preferred features of the present invention will be described in greater detail with reference to the accompanying drawings in which.

DETAILED DESCRIPTION OF PREFERRED EMBODIMENT

Figure 1:
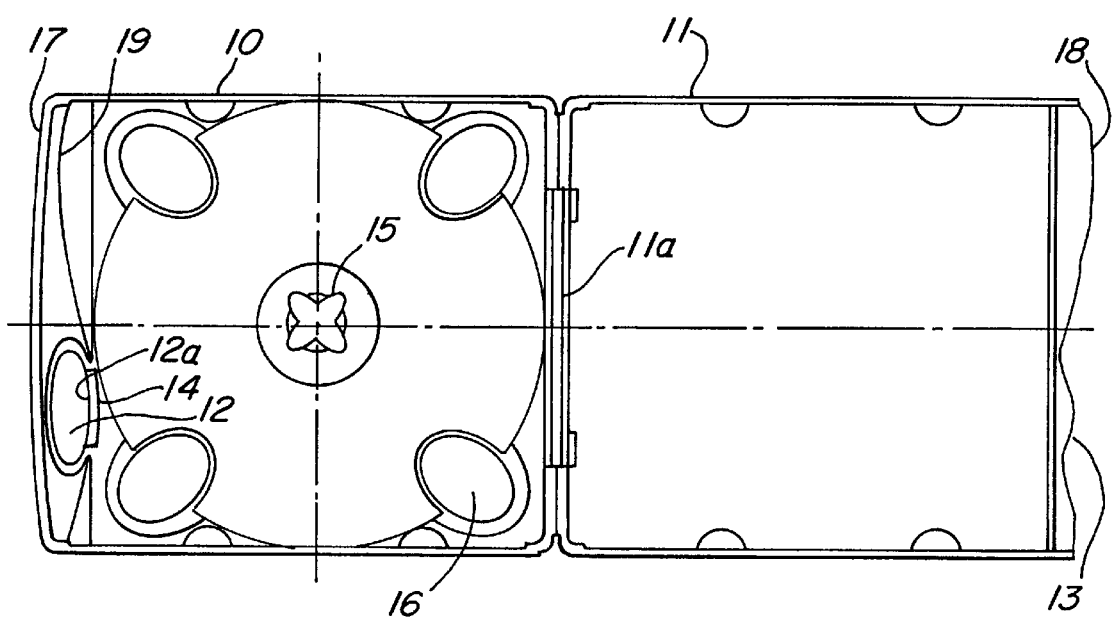
FIG. 1 is a plan view of a compact disc case according to the present invention with the hinged parts of the case in an open position.

Referring to FIG. 1 of the drawings, a preferred embodiment of the compact disc case is depicted in an open position. The case comprises hinged parts 10 and 11 preferably hinged by a plastic hinge 11a. The hinge 11a may be formed by integral parts of each of the hinged parts 10, 11 or alternatively the hinge, 11a may be separate from the hinged parts 10, 11.

Figure 3:
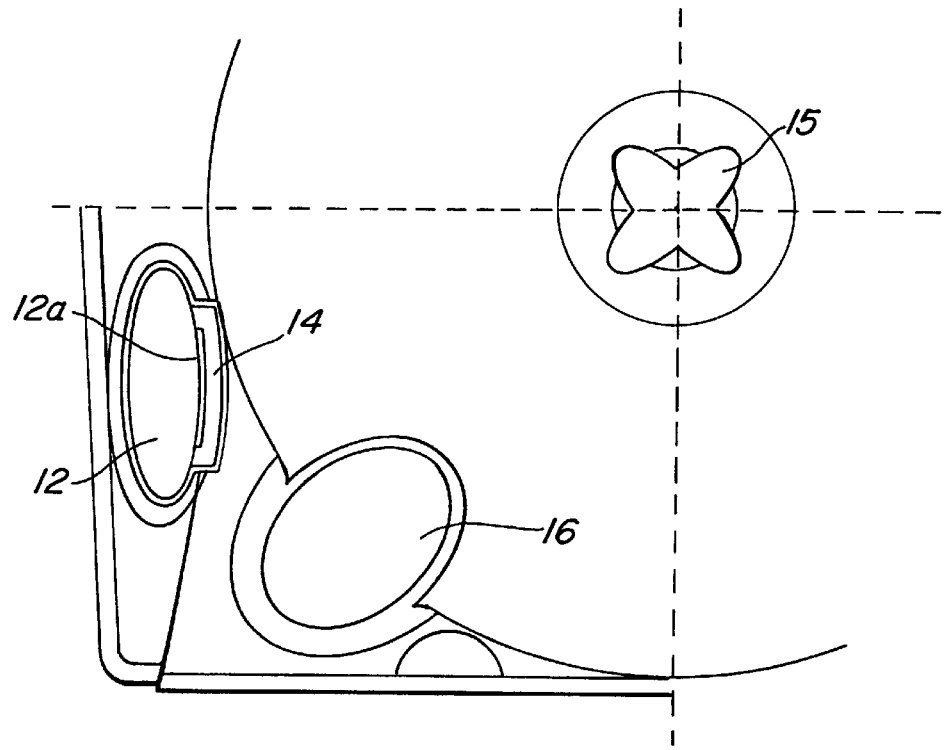
FIG. 3 is a plan view of one corner of the compact disc case illustrating features of the catch mechanism and the compact disc support area.

Referring to FIGS. 1 and 3, the case is fitted with a centrally mounted spindle 15 for locating a compact disc or similar article in the known manner. Furthermore the surface of the hinged part 10 is formed with indentations 16 located to allow entry of the fingers to pick up the edge of the compact disc for ease of removal from the case.

Figure 2:
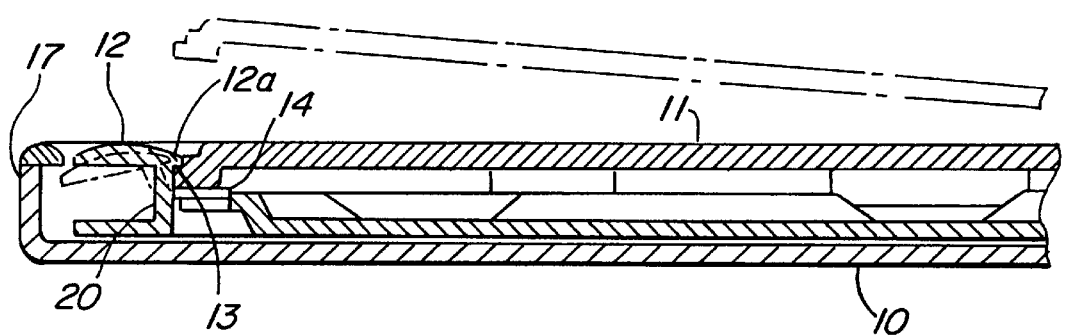
FIG. 2 is a sectional view through the compact disc case with the hinged parts closed.

Referring to FIG. 2, the hinged part, 10 includes a button portion 12 mounted on a stem 20. The button portion 12 is sized and shaped so that it may be pressed by a finger of a user. The button portion 12 has a cantilever-type mounting on stem 20 such that upon the application of a force by the finger of the user against the surface of the button 12 the stem 20 will slightly deform and move the button away from the corresponding catch portion 13 on the hinged part 11. The range of movement of the button 12 caused by the deflection of stem 20 is illustrated in dotted outline.

The button 12 includes a ledge 12a which is adapted to interact with the surface of the catch portion 13 on hinged part 11. In the closed position depicted, the ledge 12a of the button interacts with the surface of the catch portion 13 to hold the case closed.

To augment the opening of the two parts 10 and 11 when the button 12 is depressed to release the catch, a resilient biasing element 14 acts to move the hinged part 11 upwardly away from the latched position. The biasing element 14 is preferably formed integrally with the button member 12.

Therefore upon depressing the button 12 the catch is released and the hinged part 11 springs open under the action of the biasing element 14. Referring to FIG. 2 the hinged part 11 is shown in broken line in the unlatched position.

Figure 4:
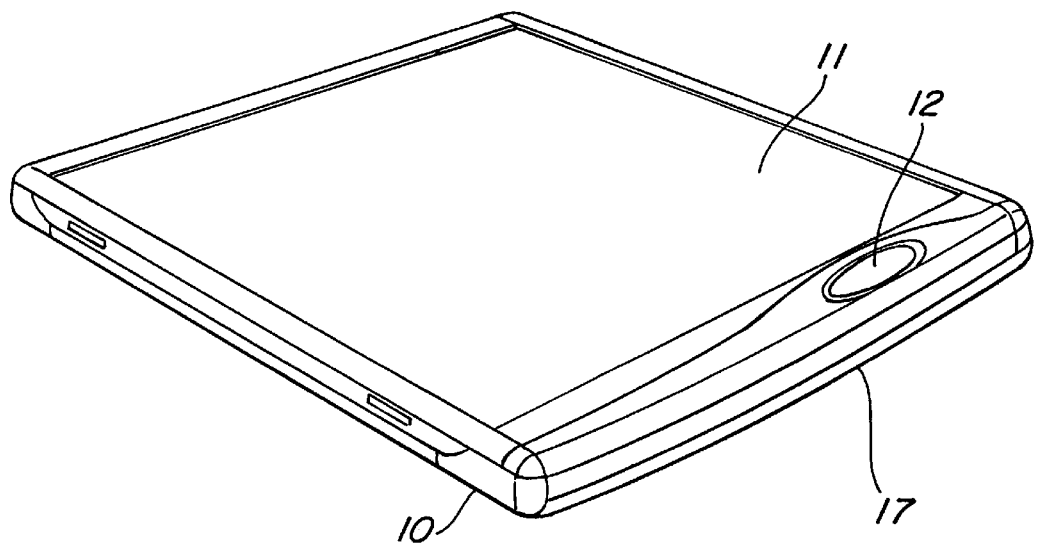
FIG. 4 is a perspective view from above the closed case.

Referring to FIG. 4, an edge surface 17 of the case is formed with a curved surface having relatively large radius of curvature to avoid unwanted light reflection and thereby enabling easy reading of information as to the content of the compact disc or like article when the case is stored in a library or storage area. In the embodiment depicted, the surface 17 is the edge surface of the free, unhinged end of part 10 of the case. It should be noted however that the surface 17 may be formed on either the unhinged or hinged ends of either part 10 or 11 of the case.

The matching edges 18 and 19 of the hinged portions as shown FIG. 3 are formed with a neat curve formation to improve the aesthetic appearance of the case. When closed, the edge 18 lies adjacent the edge 19 to provide a smooth outer surface.

We claim:

1. A storage case for a disc shaped information carrier, said case comprising:

two hinged parts adapted to house said disc shaped information carrier, one of the said hinged parts defining a base which includes a spindle on which the disc shaped information carrier may be mounted, the other said hinged part defining a lid, the lid defining a generally planar surface;

a catch mechanism on the base, said catch mechanism used for latching the lid to the base by holding said hinged parts in a closed position;

a retaining member on the inner surface of the lid;

a button integral to said catch mechanism for unlatching the retaining member in response to a force or depression of said button, the button having a ledge for engaging the retaining member, thereby latching the lid to the base in a snap fit action; and a biasing means between the lid and base, said biasing means exerting a force against the lid and base respectively when the case is in a closed position, thereby opening the case by the touch of a finger when the lid is unlatched by depression of said button.

2. The case according to claim 1, wherein the button is reasonably sized for depression by a finger of a user.

3. The case according to claim 1, wherein the button is mounted on a stem such that upon application of a force to the button by a finger of the user the stem deflects, thereby disengaging said ledge from said retaining member and unlatching the two hinged parts.

4. The case according to claim 1, wherein the biasing element is formed integrally on the base and proximate to said catch mechanism.

5. The case according to claim 1, wherein at least one edge surface of the case is curved to reduce light reflection and enable easy reading of information located along or adjacent said curved edge.

6. The case according to claim 5, wherein the said at least one edge surface is an edge surface of a free, unhinged end of part of the case.

7. The case according to claim 1 wherein said button is recessed so that the upper surface of the button does not project beyond the planar surface of the lid when the case is closed.

8. The case according to claim 1, wherein the catch mechanism is proximate the edge of said case that is opposite the edge wherein said two hinged parts are joined by a hinge.

9. The case according to claim 1, wherein the biasing element is formed integrally on the lid.

10. The case according to claim 1, wherein the biasing element is formed integrally on the base.

11. The case according to claim 1, wherein the biasing element is proximate said retaining member when the lid is closed.

12. The case according to claim 1 wherein the ledge on said button is oriented to engage the retaining member on the lid as said hinged parts are swiveled shut.

13. The case according to claim 1 wherein the surface of the button does not extend above the surface of the lid when the case is closed.

14. A compact disc case comprising:

two hinged parts adapted to house a compact disc one of the said hinged parts defining a base which includes a spindle on which a compact disc may be mounted and the other said hinged part defining a lid; and a retaining member on the inner surface of one of the hinged parts; and a catch mechanism including a button formed integrally with one of the said hinged parts and resiliently mounted to latch in a snap-fit action with the retaining member on the other hinged part, the button defining an upper surface to be pressed, wherein the surface of the button is generally aligned with the surface of the lid when the case is closed, thereby allowing a user to unlatch the lid from the base by depressing said button with the touch of a finger; and a biasing element which is disposed between the two hinged parts acts to bias the two hinged parts apart, said button to be depressed by a user to unlatch the two hinged parts, the biasing element thereby opening the case.

15. The case according to claim 14, wherein the button includes a ledge for engaging the retaining member, thereby latching the lid to the base in said snap fit action.

16. A case for a compact disc, said case comprising:

two hinged parts adapted to house a compact disc, one of the said hinged parts defining a base which includes a spindle on which the compact disc may be mounted and the other said hinged part defining a lid;

a retaining member on the inside surface of one of the hinged parts;

a catch mechanism to hold said hinged parts in a closed position, said catch mechanism including a button on one of the hinged parts to engage the retaining member on the other hinged part, said catch mechanism being resiliently mounted on a stem to latch in a snap-fit action with said retaining member, said button to be depressed by a user's finger to unlatch the two hinged parts;

a resilient biasing element acting to bias the two hinged parts apart and thereby opening the case when said catch mechanism is unlatched.

17. The case according to claim 16, wherein the lid defines a generally planar surface, the button defining an upper surface to be pressed and wherein the button is recessed so that the upper surface of the button is aligned with and does not project beyond the planar surface of the lid when the case is closed.

18. A storage case for a disc shaped information carrier, said case comprising two hinged parts adapted to house a disc shaped information carrier, one of the said hinged parts defining a base which includes a spindle on which the disc shaped information carrier may be mounted and the other hinged part defining a lid, the lid defining a generally planar surface;

a catch mechanism adapted to hold said hinged part in a closed position, said catch mechanism including a button on the base, said button being adapted to interact with the lid to form a latch, said button being formed integrally with said base, being recessed so that it does not project substantially beyond the planar surface of the lid when the case is closed and being resiliently mounted to latch in a snap-fit action with the lid, biasing means formed on the base for biasing the base and the lid apart, said button being adapted such that it can be depressed by a user to unlatch the two hinged parts so that the biasing means cause the case to open.

* * * * *